MAGNETIC WIRE SPIRAL SHIFT REGISTER

Filed Feb. 1, 1963 8 Sheets-Sheet 1

INVENTOR.
RICHARD L. SNYDER

BY Walter J. Adam

ATTORNEY

Jan. 17, 1967 R. L. SNYDER 3,299,413

MAGNETIC WIRE SPIRAL SHIFT REGISTER

Filed Feb. 1, 1963 8 Sheets-Sheet 2

INVENTOR.
RICHARD L. SNYDER

BY

Walter J. Adam

ATTORNEY

INVENTOR.
RICHARD L. SNYDER

BY

Walter J. Adam

ATTORNEY

Jan. 17, 1967 R. L. SNYDER 3,299,413

MAGNETIC WIRE SPIRAL SHIFT REGISTER

Filed Feb. 1, 1963 8 Sheets-Sheet 4

INVENTOR.
RICHARD L. SNYDER

BY

Walter J. Adam

ATTORNEY

MAGNETIC WIRE SPIRAL SHIFT REGISTER

Filed Feb. 1, 1963 8 Sheets-Sheet 5

INVENTOR.
RICHARD L. SNYDER
BY
Walter J. Adam
ATTORNEY

INVENTOR.
RICHARD L. SNYDER
BY
Walter J. Adam
ATTORNEY

INVENTOR.
RICHARD L. SNYDER
BY
Walter J Adam
ATTORNEY

MAGNETIC WIRE SPIRAL SHIFT REGISTER

INVENTOR.
RICHARD L. SNYDER
BY
Walter J. Adam
ATTORNEY 3,299,413

MAGNETIC WIRE SPIRAL SHIFT REGISTER

Richard L. Snyder, Fullerton, Calif., assignor to Hughes Aircraft Company, Culver City, Calif., a corporation of Delaware Filed Feb. 1, 1963, Ser. No. 255,581
13 Claims. (Cl. 340—174)

This invention relates to magnetic information retaining devices and particularly to a highly reliable memory system for storing magnetic informational domains in a magnetic medium having a spiral configuration so as to provide a large storage capacity in a relatively small space.

In digital computer operation, storage of a great number of binary informational bits are required both in the external equipment as well as in the internal computer memory. Conventional storage means such as rotating magnetic drums, moving tape or punched cards have the disadvantages of requiring mechanical motion and providing relatively large dimensions when required to store substantial amounts of information. Storage systems utilizing the principle of establishing and shifting a series of magnetic domains of selected polarities through an elongated magnetic medium have advantages such as being mechanically static, highly reliable and greatly simplified. A magnetic shift register that utilizes relatively short magnetic domains, allows close spacing of the magnetic wires, is easily constructed and has a high degree of performance reliability, would be very advantageous to the art.

It is, therefore, an object of this invention to provide a highly reliable magnetic storage system that has a large packing density of the magnetic medium and has relatively small external dimensions.

It is a further object of this invention to provide a memory system having a disc or plate configuration utilizing spirally wound magnetic mediums.

It is another object of this invention to provide a shift register memory system that is easily and simply constructed to provide highly reliable operation.

It is still another object of this invention to provide a shift register system utilizing relatively small magnetic mediums or wires but providing relatively large output signals.

It is another object of this invention to provide a shift register memory element in which a magnetic wire is positioned on a plate with a predetermined longitudinal tension so as to provide desirable properties for propagation of magnetic domains therealong.

It is another object of this invention to provide a method and apparatus for positioning and maintaining a magnetic wire on a flat surface with the magnetic wire having a predetermined longitudinal tension.

Briefly, in accordance with this invention, a shift register includes complementary right and left hand spirals of a magnetic medium or wire mounted on rectangular or circular plates of metal. In one arranment, the plates are covered with a soft material and the wire is pressed therein with a desired constant longitudinal tension to form the fine pitch spiral configurations. The two discs having complementary spirals are placed in the magnetic field of a two phase propagating array having a radial configuration. Also in accordance with the principles of this invention, a single spiral configuration may be utilized. The record coil and the sense coil for the shift register may be formed by placing double, complementary spiral conductors, for example, at each end of the magnetic wires. In order that the fine pitch spiral may be utilized, the magnetic wires have small diameters with gradual tapers to larger diameters at the ends adjacent to the sense coil for forming reliably large output signals. The polyphase driving array responds to a source of driving currents to propagate along both magnetic wires, magnetic domains established at the write coil. The moving magnetic domains at the sense coil develop sensed signals which are applied to a read circuit. The high density storage system in accordance with this invention provides relatively close spacing of the small magnetic wires and allows relatively short magnetic domains to be utilized.

The novel features of this invention, as well as the invention itself, both as to its organization and method of operation, will best be understood from the accompanying description taken in connection with the accompanying drawings, in which like characters refer to like parts, and in which.

Figure 1:
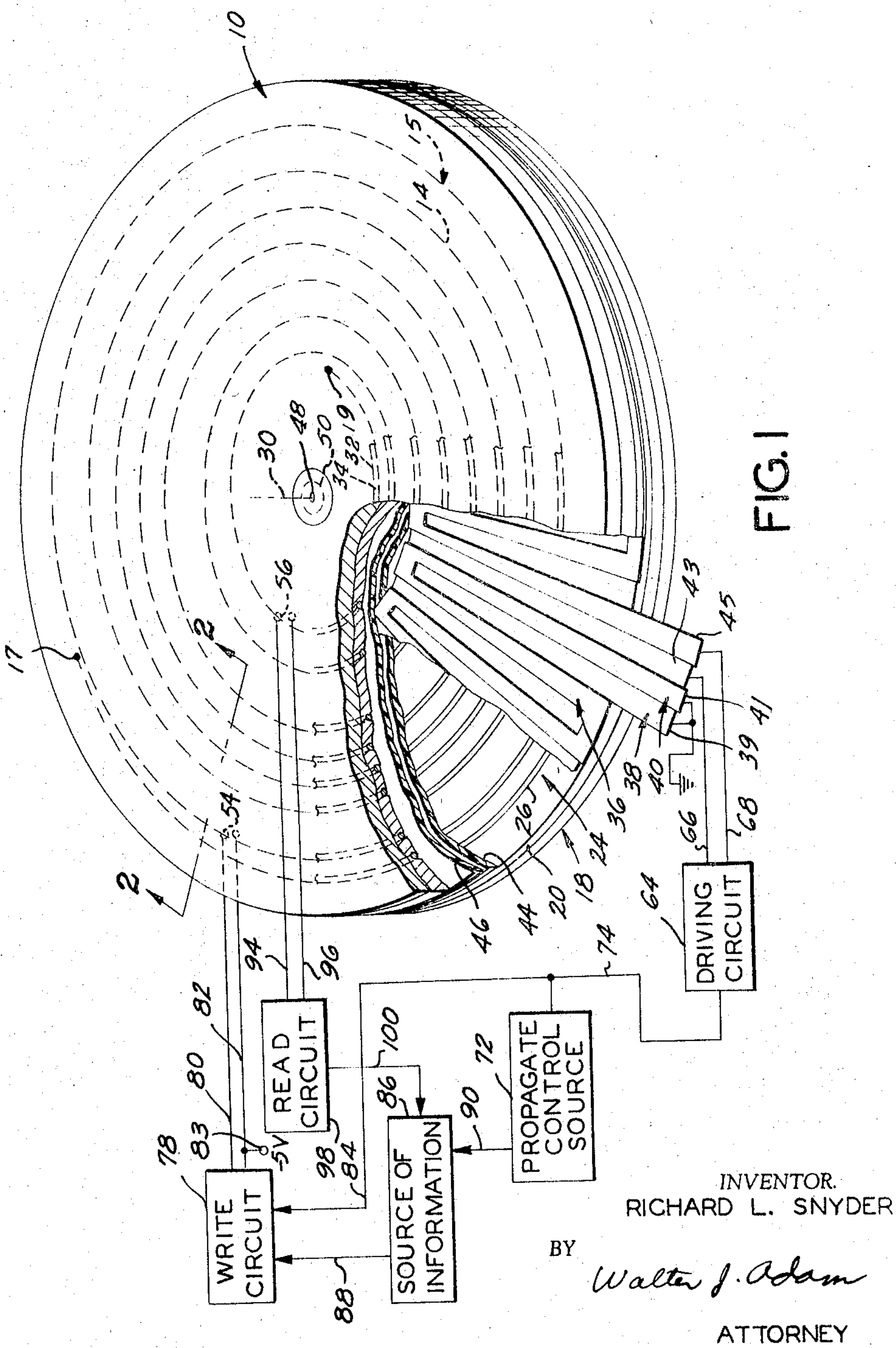
FIG. 1 is a perspective and block diagram of the spiral shift register system in accordance with this invention having portions of the perspective view broken away for clarity of description.
Figure 2:
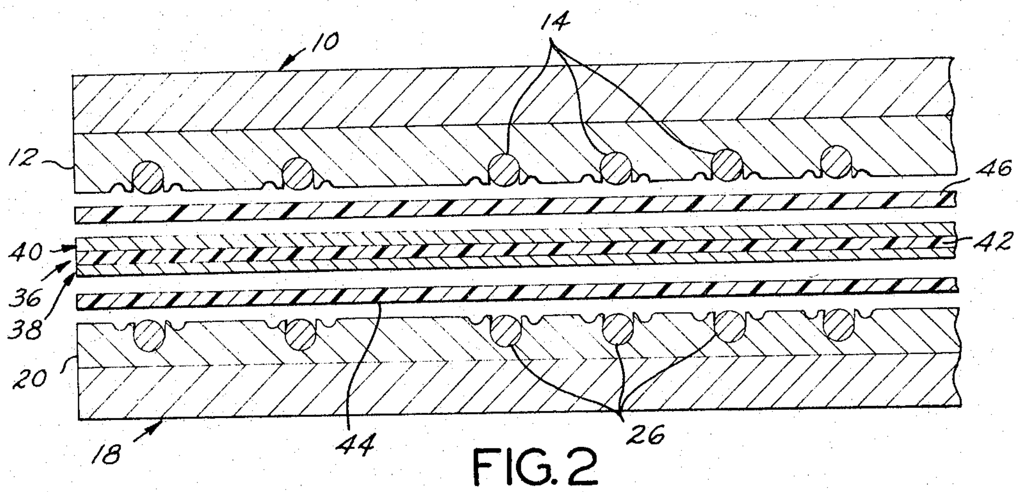
FIG. 2 is a cross sectional view taken at lines 2—2 of the spiral shift register of FIG. 1 showing a first arrangement for attaching the spiral wire configurations to the plates.

Referring first to the partially perspective drawing of FIG. 1 and to the section of FIG. 2, the shift register system in accordance with the invention includes a first plate 10 formed of a non-magnetic material such as aluminum with a film 12 of a soft material such as lead or epoxy deposited thereon. The plate 10 may have any desired configuration such as a rectangular shape or a round disc shape. Positioned fixedly in the film 12 with a predetermined longitudinal tension is a ferro-magnetic wire 14 in the form of a spiral array 15 shown dotted in FIG. 1 as the wire is positioned on the lower surface of the plate 10.

A second or lower plate 18 having similar shape to that of the plate 10 may be of a similar non-magnetic material and includes a film 20 of a soft material such as lead or epoxy. A magnetic wire 26 is positioned in the film 20 under a predetermined longitudinal tension in the configuration of a spiral array 24. The spiral arrays 15 and 24 are complementary to each other looking at the plates 10 and 18 from the deposited film side, that is, spiral in opposite directions relative to an axis 30. The magnetic wires 14 and 26 may be any suitable wire having a high degree of longitudinal magnetic orientation. The wires 14 and 26 may be made from an alloy containing 72% nickel and 28% iron, for example. It is to be noted at this time that one end of both of the magnetic wires 14 and 26 has a gradually increasing taper such as 32 at an end 34 of the wire 14. The enlarged sections such as at the end 34 are positioned adjacent to sense coil 56 which is also a loop of the spiral that has a greater pitch than the main storage section having the finer wire. A record coil 54 at the other end of the spiral may also be positioned adjacent to loops having large pitches. The magnetic wires such as 14 may be fastened to the plate 10 under axial tension by suitable fastening arrangements such as pins 17 and 19. However, with the wires 14 and 26 retained in the films such as 12, pieces of tape may be utilized at the ends of the wires instead of the pins such as 17 and 19.

Positioned between the plates 10 and 18 is a polyphase or two phase conductor array 36 including first and second conductors 38 and 40. A sheet 42 of insulating material such as Mylar is positioned between the conductors 38 and 40 as best seen in the section of FIG. 2. Sheets 44 and 46 of insulating material which may also be of any suitable material such as Mylar are respectively positioned between the film 12 and the polyphase array 36 and between the polyphase array 36 and the film 20 as may also be seen in the section of FIG. 2. In order to properly orient the spirals 15 and 26 relative to each other so the wires are adjacent to each other through the conductor array 36, a hole 48 at the axis 30 may include a bolt 50 preferably of a non magnetic material. The wires 14 and 26 when contacting metal such as the film 12 have been found to provide improved propagation of magnetic domains when coated with an insulating material such as varnish.

The write coil 54 shown dotted in FIG. 1 may be positioned between the magnetic wire 14 and the polyphase driving array 36. Also the sensing coil 56 shown dotted may be positioned between the magnetic wire 14 and the array 36. The coils 54 and 56 are in the fields established by both magnetic wires 14 and 26.

For developing the polyphase driving fields to propagate magnetic domains through the magnetic wires 14 and 26, a driving circuit 64 is coupled through leads 66 and 68 to respective conductor sections 43 and 45 of the driving conductors 38 and 40. The ends of conductor sections 39 and 41 of respective conductors 38 and 40 are coupled to a suitable source of reference potential such as ground. A source of propagate control pulses 72 controls the timing of the driving circuit 64 through a lead 74. A write circuit 78 responds to propagating pulse signals from a lead 84 and to binary information signals applied from a source of information 86 through a lead 88 to apply write pulses through a lead 80 to the write coil 54. The other end of the coil 54 is coupled through a lead 82 to a suitable source of reference potential such as a −5 volt terminal 83. The source of information 86 is synchronized by propagation command pulses applied through a lead 90. Binary signals sensed by the sense coil 56 as magnetic informational domains are propagated thereby, are applied through leads 94 and 96 to a read circuit 98 which in turn applies the amplified information through a lead 100 to the source of information 86 to be processed or recirculated.

Figure 3:
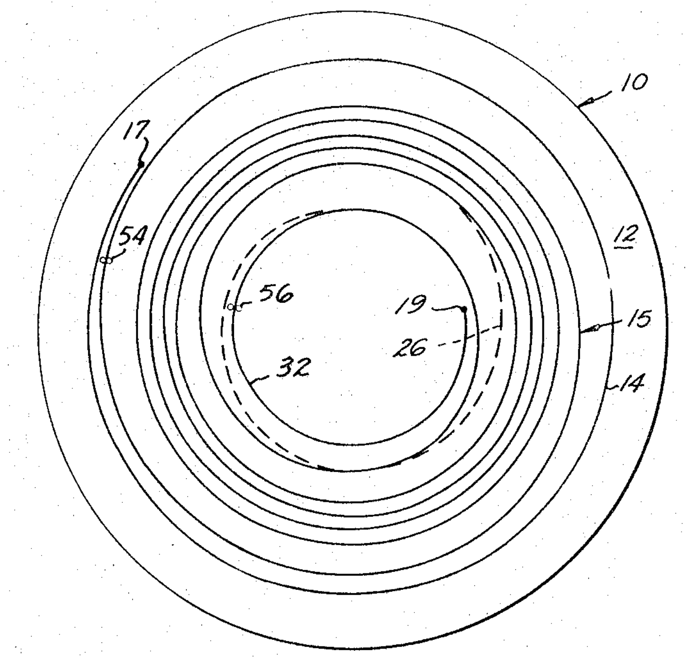
FIG. 3 is a plan view of one of the discs and attached spiral conductors of FIG. 1.

Referring now to the plan view of FIG. 3 showing the plate 10 from the film 12 side (FIG. 2) thereof, the innermost and outermost loops of the wire 14 of the spiral 15 have a relatively coarse pitch ending in circles which are respectively smaller and larger than the spiral so as to allow a space for the write and sense coils 54 and 56. Between the terminal loops, the wire is closely spaced to form a fine pitch spiral. To permit high storage densities resulting from short domains and close pitched spirals the wire 14 has a very small diameter. The mounting points 17 and 19 which may be pins, for example, maintain the wire 14 under the desired axial tension as will be explained subsequently. The plate 18 (FIG. 1) has a complementary spiral wound thereon as shown by the dotted magnetic wire 26. Thus, when the plates 10 and 18 are positioned with the wire sides adjacent to each other, the wires are aligned and positioned adjacent to each other throughout the two spirals.

Figure 4:
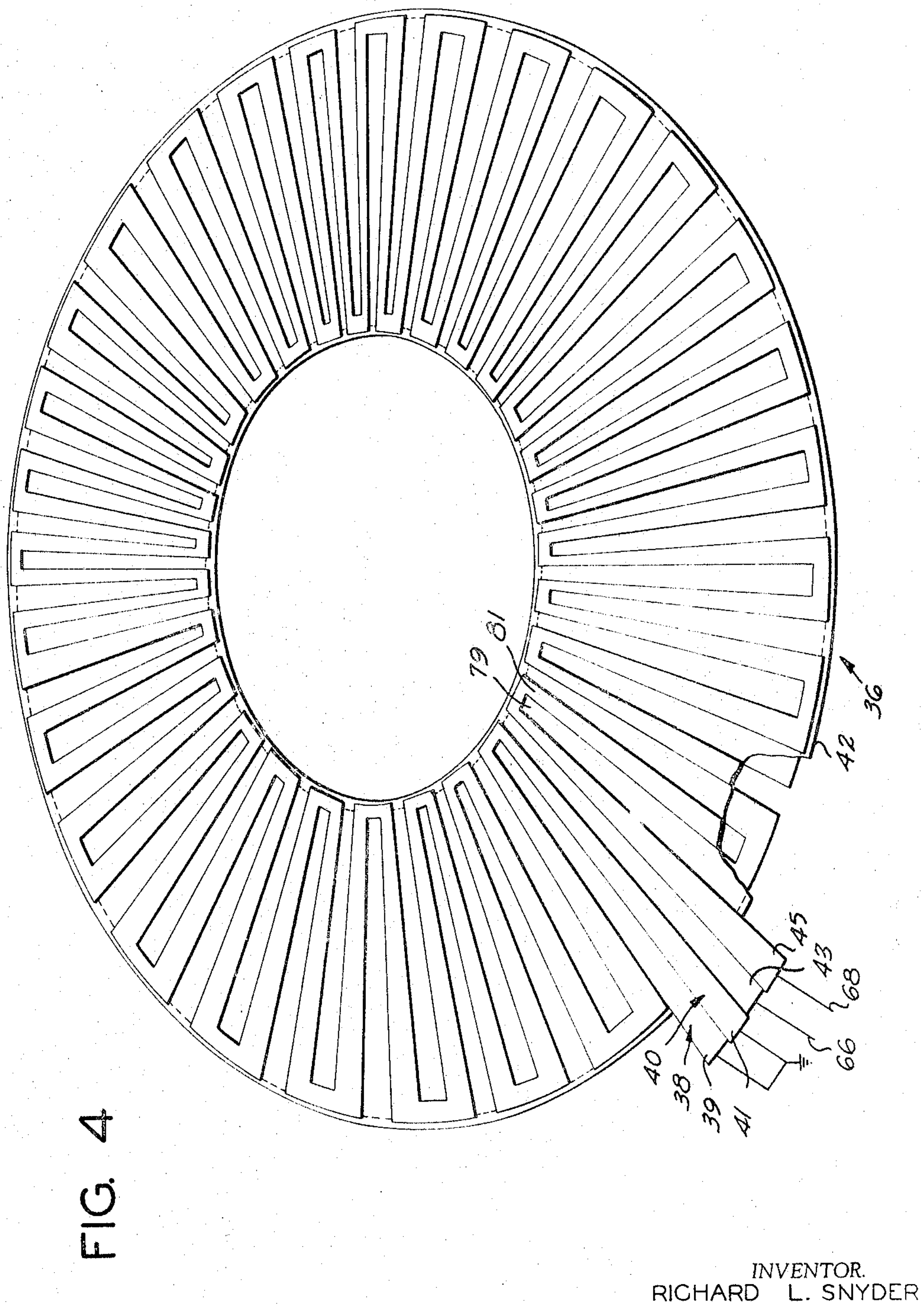
FIG. 4 is a perspective drawing of the radial polyphase driving array utilized in the spiral shift register of FIG. 1.

Referring now to the perspective drawing of FIG. 4 showing the polyphase driving array 36, the conductors 38 and 40 are separated by the non-conductive strip 42 as may also be seen in the section of FIG. 2. Each conductor 38 and 40 of the radial two phase propagation array may be formed of copper or other conducting material by photo etching, for example. As will be discussed subsequently, the array 36 responds to driving current pulses to propagate magnetic domains sequentially through all portions of the magnetic storage wires 14 and 26.

Figure 5:
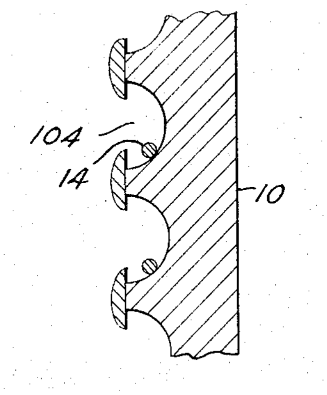
FIG. 5 is a sectional view for explaining a second arrangement in accordance with this invention of attaching the spiral wire configurations to the plates of FIG. 1.

Referring now to FIG. 5 as well as to FIG. 3, another arrangement for maintaining the magnetic wires 14 and 26 positioned on the respective plates 10 and 18 will be described. The first arrangement of pressing the magnetic wire into a film of soft material as shown in FIG. 2 will be explained in further detail subsequently. The method of making the plates of FIG. 5 is to photoetch spiral patterns from a single photographic negative. The plates 10 and 18 are first electroplated with a metal film different from the plate metal. When the spiral pattern has been photoetched through the outer layer of this metal film, the etchant is changed from one which attacks the surface layer to one which does not react with the surface metal but removes the base metal. This procedure produces a plate 10 having grooves such as 104 of FIG. 5 in which the wires 14 or 26 may be positioned under axial tension.

Figure 6:
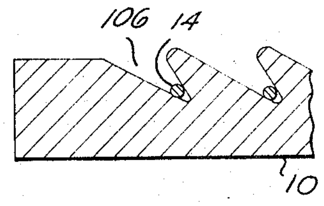
FIG. 6 is a sectional view for explaining a third arrangement in accordance with this invention for attaching the spiral wire configurations to the plates of FIG. 1.

Another method of forming the grooves in the plates 10 and 18 forms grooves as shown in the sectional drawing of FIG. 6. The grooves such as 106 may be formed in the plate 10 by rolling with a single hardened rolling tool which may be enforced by a backing plate in a suitable machine such as a lathe. The plate 10 or the tool is rotated so that a continuous spiral groove such as 106 is formed. The spiral grooves 106 may also be formed by dies in a high energy press as the velocity and energy is so great that the plate heats to a relatively high instantaneous temperature. As the plate cools rapidly and shrinks, the die may be removed.

A third method of forming grooved plates similar to that of FIG. 6 is to mold a plastic in a mold of flexible material such as a silicone rubber cast on a rolled plate that serves as a pattern.

Figure 7:
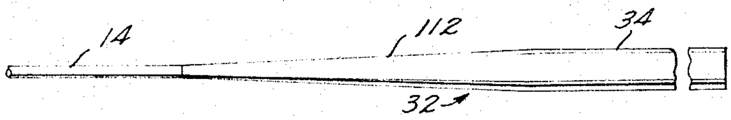
FIG. 7 is a schematic drawing showing the taper from a small diameter to a relatively large diameter utilized at the end of the spirally wound magnetic wires of FIG. 1 in accordance with the invention.

Referring now to FIG. 7 the spirals of magnetic wires in accordance with this invention will be further explained. The close pitch spiral that may be utilized in the double complementary wire configuration may have as many as 8 to 200 grooves per inch of radius. These fine pitches may be used with complementary domain systems having two wires forming essentially closed magnetic paths for each domain. Each magnetic domain is maintained in lengths of the wires 14 and 26 magnetized with selected polarities. Single isolated spirals may be used reliably with coarse pitches. Complementary domain systems are required when a plurality of the discs are stacked. The diameters of the wires 14 and 26 may be in the range of 0.00015 inch to 0.001 inch. A practical method of producing this small wire is by chemically or electrolytically etching a larger wire such as 0.001 inch wire down to the required smaller size. However, the very fineness of this wire which reduces the interference flux also decreases the amplitude of the signal sensed by the sense coil to a level that may be difficult to detect relative to the system noise. To increase the level of the sensed output signal, the wires such as 14 are tapered at the end such as 32 so that the cross sectional area increases at a taper 112 to almost the initial value prior to formation at the end 34. This relatively large area is provided as the wire traverses the last coarse pitched spiral groove adjacent to the sense coil 56. By forming the taper 112 to be relatively gradual, the magnetic domain walls will be propagated with gradually increasing flux to the large diameter of the wire 14 so that the sense coil 56 will detect a relatively large signal. Etching or polishing of the wires 14 and 26 is preferably done in such a manner that a highly polished surface results.

Figures 8, 9:
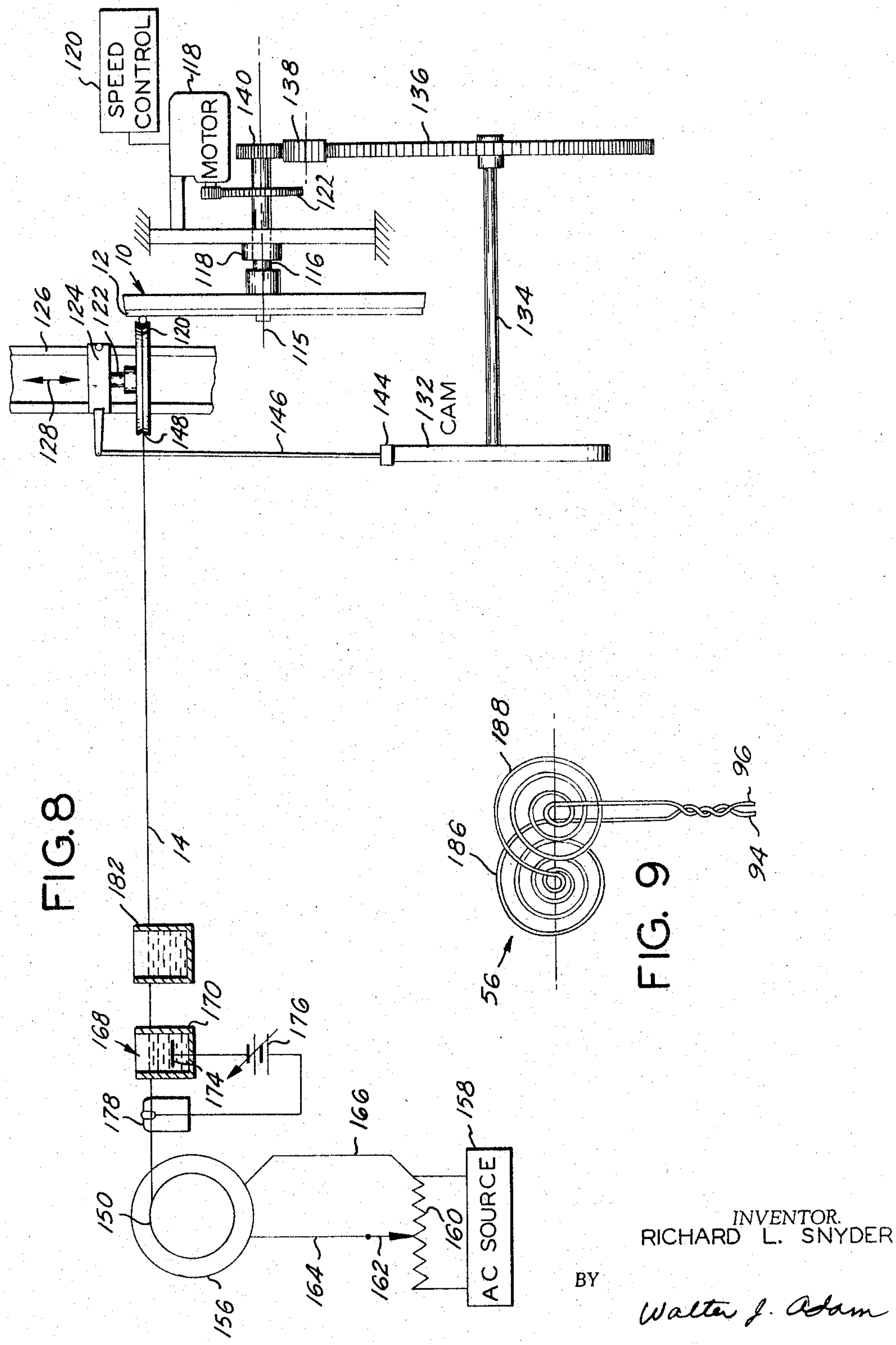
FIG. 8 is a schematic drawing showing a method in accordance with this invention of forming the spirally wound plates or discs of FIGS. 1 and 3.
FIG. 9 is a schematic enlarged plan view of the write coil and sense coil of the system of FIG. 1.

The spirals such as 15 of FIG. 1 may be formed for example by the arrangement of FIG. 8 utilizing the disc 10 covered with the film 12 which may be lead or other suitable soft material. The disc 10 is mounted on an axle 116 having an axis 115 and rotating in a fixed structure 18 in response to a variable speed motor 118. A speed control circuit 120 controls the motor 118 so that the wire 10 may be polished at varying speeds. A suitable drive arrangement such as a gear 122 may be provided between the axle 116 and the motor 118. To press the wire 14 into the material of the film 12, a pulley wheel 120 is provided suitably mounted such as with ball bearings to an axle 122. The pulley wheel 120 has a groove 148 at the external circumference thereof to hold the wire 14. A movable mounting structure 124 is fixed to the axle 122 and is movable in a radial direction on a frame 126 as indicated by an arrow 128. A cam 132 rotates on an axle 134 connected through gears 136, 138 and 140 to the axle 116. A cam follower 144 contacts the cam 132 and is connected through a rigid arm 146 to the movable mounting frame 124. The cam guiding the roller is shaped to produce the coarse pitch end loops as well as the fine pitch intermediate spiral. It is to be noted that suitable mounting structure is provided for the gears and the arm 146 but is not shown for clarity of illustration.

The cam 132 which rotates through one cycle under control of the gears as the plate 10 rotates the number of times to produce all of the loops of the spiral has a configuration to move the pulley 120 inward toward the axis 115 at a first rate so as to form the outer loop of the spiral 15, at a slow rate to form the close pitch portion of the spiral and at a fast rate to form the inner loop of the spiral 15. The cam configuration may also provide for returning the pulley to the outer edge of the plate 10 as a spiral is formed.

The wire 14 passes around the groove 148 in the pulley 128 and is initially pressed into the film 112 by controlling the mounting structure 124. The outer end of the wire 14 is fixed to the plate 10 such as by the pin 17 (FIG. 1). The wire 14 is stored on a spool 150 attached to the axle of a servo motor 156 which may be a two phase A.C. (alternating current) servo motor in which the amplitude of the A.C. signal provides a variable torque. A source of A.C. signals 158 applies signals to a potentiometer arrangement including a resistor 160 and an adjustable tap 162. A lead 164 couples the arm 162 to the motor 156 and a lead 166 couples the reference voltage from the source 158 to the motor 156. A phase shifting capacitor (not shown) may be provided in the servo motor 156. Thus a selected tension is provided by the servo motor 156 so that the wire 14 is pressed into the film 12 with a longitudinal tension which is permanently maintained, which as will be discussed subsequently provides highly reliable operation in accordance with this invention.

Polishing of the wire to a desired diameter is provided by a polishing bath 168 including a tank 170 having a suitable liquid therein such as a perchloric acid with suitable inhibitors added thereto. To provide this operation, a cathode 174 is positioned in the liquid coupled to the negative terminal of a suitable source of potential such as a variable battery 176. The positive terminal of the battery 176 is coupled to a mercury contact 178 which is a convenient arrangement for referring the potential of the battery 176 to that of the wire 14. To remove the polishing liquid, a washing tank 182 having water therein is provided for the wire 14 to pass therethrough after passing through the tank 170.

Thus, the wire 14 is polished in a continuous bath and is pressed into the plate 10 under a selected tension with a desired spiral configuration. In an electrolytic polishing system, the removal of metal is directly proportioned to the time of polishing or the time during which the wire 14 is in the polishing tank 170. Thus at the end 32 of the wire 14 when forming the inner portion of the spiral 15, the speed control 120 is varied so as to gradually increase the speed of the motor 118 to a second increased speed. The polishing time is therefore varied to form the taper 112 of FIG. 7. The material removed in the bath 168 is also proportional to the electrolytic current from the battery 176 which may also be varied to control the diameter of the wire 14.

Figure 15:
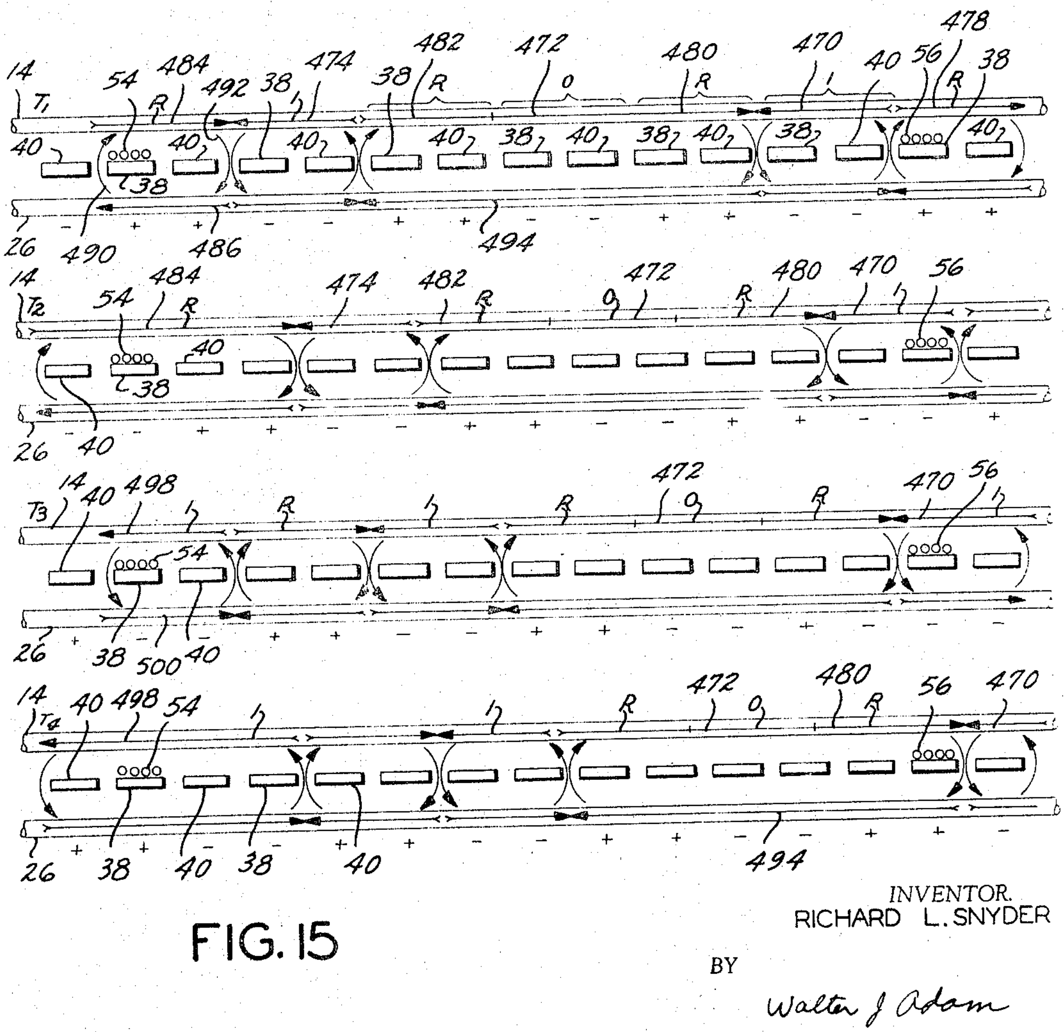
FIG. 15 is a diagram for explaining the operation of the complementary magnetic domains in the system of FIG. 1.

Referring temporarily to FIG. 15, the system in accordance with this invention establishes magnetic domains of opposite polarity relation in the magnetic wires 14 and 26. A reference domain of a fixed polarity is provided between each two adjacent information domains having, for example, a polarity in the same direction as the reference domain for a binary "zero" and in the opposite direction from the reference domain for a binary "one". Domain walls are established between two adjacent domains of opposite polarity and adjacent domains of the same polarity extend to form a single domain region. The presence of a domain wall is sensed as a binary "one" and the absence of a domain wall resulting from an adjacent reference domain and an informational domain being of the same polarity is sensed as the absence of an output signal or a "zero". A substantially closed magnetic path is provided between the wires 14 and 26 for domains such as shown by arrows 484 and 486 by the flux path indicated by arrows 490 and 492.

Referring now to FIG. 9 one arrangement in accordance with this invention of the sense coil 56 and the write coil 54 includes first and second spiral winding sections 186 and 188 with the spirals overlapping each other for approximately one half the width of each. Also the spiral winding sections 186 and 188 are wound in opposite directions. As shown in FIGS. 1 and 2, the spiral sections 186 and 188 are adjacent to the magnetic wire 14 as well as the wire 26 through the driving array 36. The pitch of the spiral arrays 15 and 24 at the coils 54 and 56 is such that the moving magnetic domains from only one section of magnetic wire induces substantial fields in the spiral sections 186 and 188. The sense coil 56 provides cancellation of signals developed by the driving fields and as a magnetic domain moves past the overlapping portion of the spiral coils develops a combined voltage amplitude. The write coil 54 may be similar to the sense coil 56 so that induced voltages which may affect the write circuit 78 (FIG. 1) are cancelled. Also the overlapping of the windings 186 and 188 may be utilized in the write coil 154 for convenience of construction.

Figure 10:
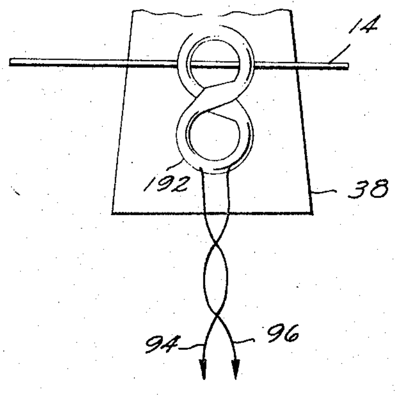
FIG. 10 is a schematic plan view of a second arrangement of the write coil and sense coil in accordance with the invention.

Another arrangement that may be utilized for the sense and write coils shown in FIG. 10 may be formed by winding a ring of very fine wire and twisting the ring into a figure eight structure 192. One coil of the structure 192 is adjacent to the wire 14 and both coils are adjacent to a single radial section of the polyphase conductor such as 38. Thus, any voltages developed in the coil structure 192 by stray driving fields are cancelled before passing to the leads 94 and 96. A similar structure may be utilized for both the sense coil 56 and the write coil 54. It is to be noted at this time that the structure 192 does not provide the voltage summing as does the coil of FIG. 9 but may be easier to construct.

Figure 11:
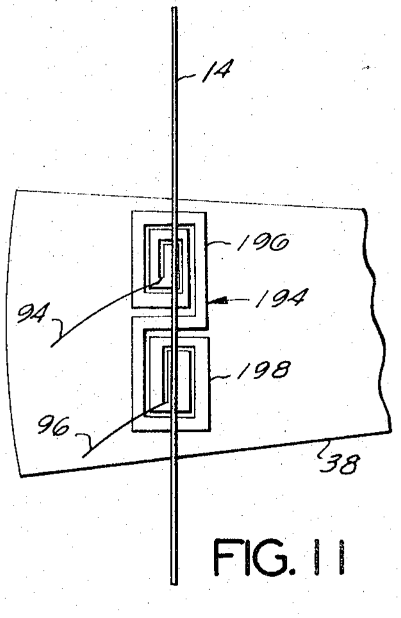
FIG. 11 is a schematic plan view of a third arrangement of the write coil and sense coil in accordance with this invention.

Another arrangement that may be utilized for the sense coil and write coil in accordance with this invention shown in FIG. 11 is a rectangular spiral conductor 194 having complementary first and second spiral sections 196 and 198 with the leads 94 and 96 coupled to the center points thereof. Each of the internal windings of the rectangular spirals 196 and 198 is a double wire so that when a magnetic domain wall moves past the central section a voltage signal of twice the amplitude as at the ends is induced. Another feature of the coil of FIG. 11 is that a single wire is utilized at the sides of the rectangular spirals 196 and 198 so that a minimum of space is utilized allowing closer spacing of the wire 14. The sections 196 and 198 are both placed adjacent to the magnetic wire 14 and adjacent to a single radial section of the propagation conductor such as 38. Thus, undesired voltages induced in the two spiral sections 196 and 198 cancel each other. Therefore, the output voltages induced in the sections 196 and 198 in response to a magnetic domain wall moving along the wire 14 have a summed portion. A similar configuration to that of FIG. 11 may be formed from magnetic wire.

Figures 12, 14:
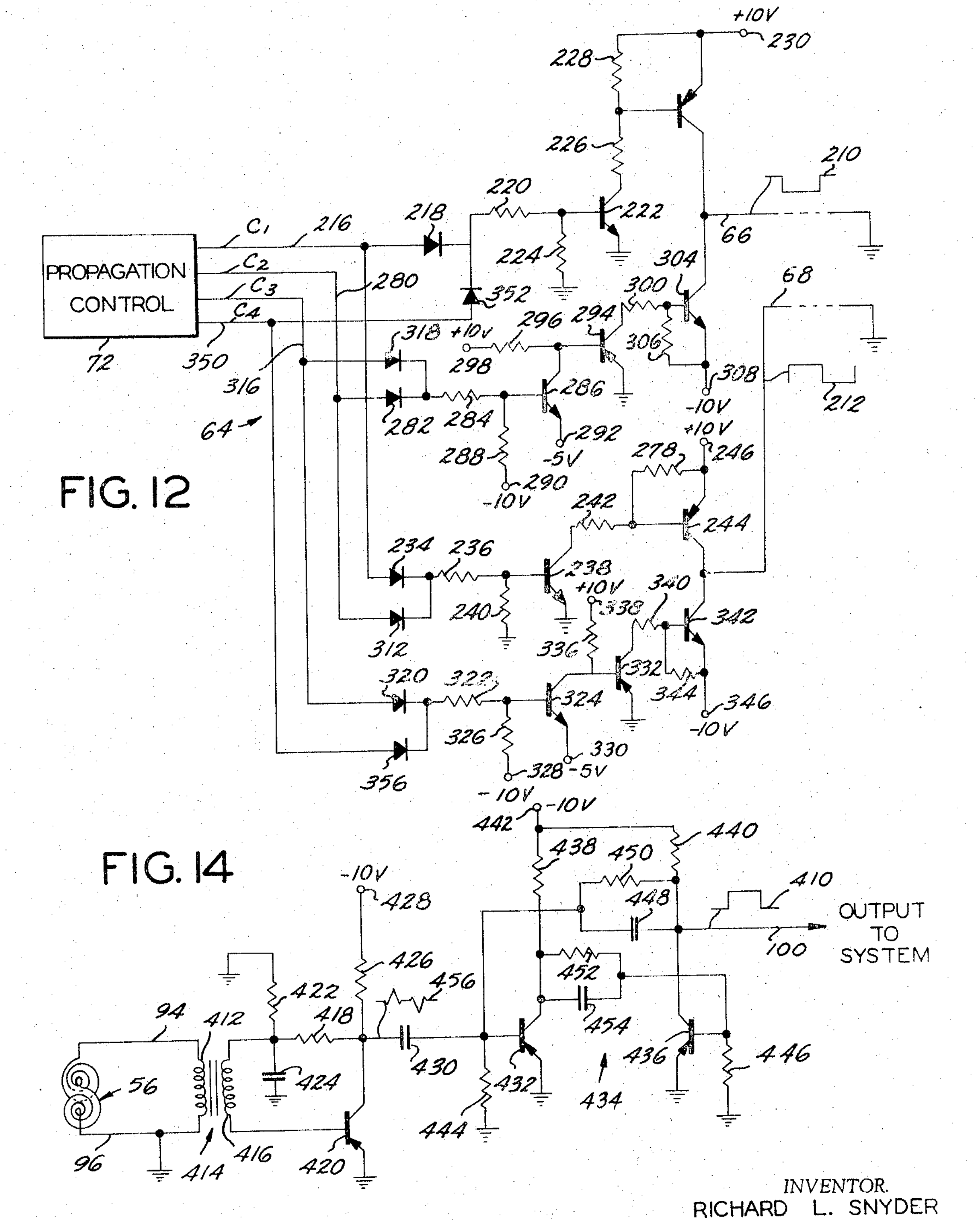
FIG. 12 is a schematic circuit drawing of the polyphase driving circuit of FIG. 1.
FIG. 14 is a schematic circuit and block diagram of the read circuit of FIG. 1.

Referring now to FIG. 12, the driving circuit 64 responds to the propagating pulse source 72 which has a four period timing sequence that may, for example, occur at a uniform frequency. As may be seen in FIG. 16, the propagation control source 54 provides timing or clock signals $C_1$, $C_2$, $C_3$ and $C_4$ of waveforms 200, 202, 204 and 206 having pulses at respective times $T_1$, $T_2$, $T_3$ and $T_4$. In response to these clock pulses the driving circuit 64 applies driving current signals of waveforms 210 and 212 to respective leads 66 and 68 which as will be explained subsequently provides the continuous driving fields around the driving array 36 of FIG. 1. The first clock signal $C_1$ is applied through a lead 216, through the anode to cathode paths of a diode 218, and through a resistor 220 to the base of an npn type transistor 222. The base of the transistor 222 is also coupled to ground through a resistor 224, the emitter is coupled directly to ground, and the collector is coupled through series coupled resistors 226 and 228 to a +10 volt terminal 230. The signal is applied from between the resistors 226 and 228 to the base of a pnp type transistor 232 of which the emitter is coupled to the terminal 230 and the collector is coupled to the conductor 66. The clock signal $C_1$ is also applied from the lead 216 through the anode to cathode path of a diode 234 and through a resistor 236 to the base of an npn type transistor 238. The base of the transistor 238 is coupled to ground through a biasing resistor 240, the emitter is coupled to ground and the collector is coupled through a resistor 242 to the base of a pnp type transistor 224. A suitable source of potential such as a +10 volt terminal 246 is coupled to the emitter of the transistor 244 and through a resistor 278 to the base thereof. The collector of the transistor 244 applies a signal to the conductor 68.

A second clock signal $C_2$ of the waveform 202 (FIG. 16) is applied from a lead 280 through the anode to cathode path of a diode 282 and through a resistor 284 to the base of an npn type transistor 286. The base of the transistor 286 is also coupled through a resistor 288 to a −10 volt terminal 290, the emitter is coupled to a −5 volt terminal 292, and the collector is coupled to the base of a pnp type transistor 294. The base of the transistor 294 is also coupled through a resistor 296 to a +10 volt terminal 298, the emitter is coupled to ground and the collector is coupled through a resistor 300 to the base of an npn type transistor 304. The base of the transistor 304 is also coupled through a resistor 306 to a −10 volt terminal 308, the emitter is coupled to the terminal 308 and the collector applies a signal to the conductor 68. The clock signal $C_2$ is also applied from the lead 280 through the anode to cathode path of a diode 312 to the resistor 236 and the transistor 238.

A clock signal $C_3$ of the waveform 204 (FIG. 16) is applied from a lead 316 through the anode to cathode path of a diode 318 and to the resistor 284 and the transistor 286. The clock signal $C_3$ is also applied from the lead 316 through the anode to cathode path of a diode 320 and through a resistor 322 to the base of an npn type transistor 324. The base of the transistor 324 is also coupled through a biasing resistor 326 to a −10 volt terminal 328, the emitter is coupled to a −5 volt terminal 330, and the collector is coupled to the base of an pnp type transistor 332. The base of the transistor 332 is also coupled through a biasing resistor 336 to a +10 volt terminal 338, the emitter is coupled to ground and the collector is coupled through a resistor 340 to the base of an npn type transistor 342. The base of the transistor 342 is also coupled through a resistor 344 to a −10 volt terminal 346, the emitter is coupled to the terminal 346 and the collector applies a signal to the conductor 68.

The clock signal $C_4$ of the waveform 206 (FIG. 16) is applied from a lead 350 through the anode to cathode path of a diode 352 to the resistor 220 and the transistor 222. Also, the clock pulse $C_4$ is applied from the lead 350 through the anode to cathode path of a diode 356 and to the resistor 322 and the transistor 324.

In operation the transistors of FIG. 12 are non-conductive except in response to specific clock pulses. At time $T_1$ the transistor 222 and in turn the transistor 230 are biased into conduction to develop the positive current pulse of the waveform 210. At the same time, the transistor 238 and in turn the transistor 244 are biased into conduction to apply the positive current pulse of the waveform 212 to the conductor 68. At time $T_2$ in response to the clock signal $C_2$ of the waveform 202 (FIG. 16), the transistor 286 and in turn the transistors 294 and 304 are biased into conduction to apply a negative voltage pulse to the conductor 66 as shown by the negative current pulse of the waveform 210. Also, at time $T_2$ the transistor 238 and in turn the transistor 244 are maintained in conduction to continue the positive voltage pulse applied to the conductor 68 indicated by the positive current pulse of the waveform 212.

At time $T_3$ the clock signal $C_3$ of the waveform 204 maintains the transistor 286 and in turn the transistors 294 and 304 biased in conduction. Thus, the negative pulse indicated by the current pulse of the waveform 210 is applied to the conductor 66. At the same time, the transistors 324, 332 and 342 are biased into conduction to apply the negative voltage pulse to the conductor 68 as indicated by the current pulse of the waveform 212. At the time $T_4$ the clock signal $C_4$ biases the transistor 222 and in turn the transistor 232 in conduction to apply a positive voltage pulse to the conductor 66 indicated by the current pulse of the waveform 210. Also, at time $T_4$ the clock signal $C_4$ is applied through the diode 356 to maintain the transistors 324, 332 and 342 biased in conduction so that the negative current pulse of the waveform 212 is maintained. The current pulses of the waveforms 210 and 212 are continually applied to the conductors 66 and 68 of FIG. 1 to provide the polyphase driving operation. The operation of the circuit of FIG. 12 continues in a similar manner through other cycles such as $T_1'$ to $T_4'$ and will not be explained in further detail.

Figure 13:
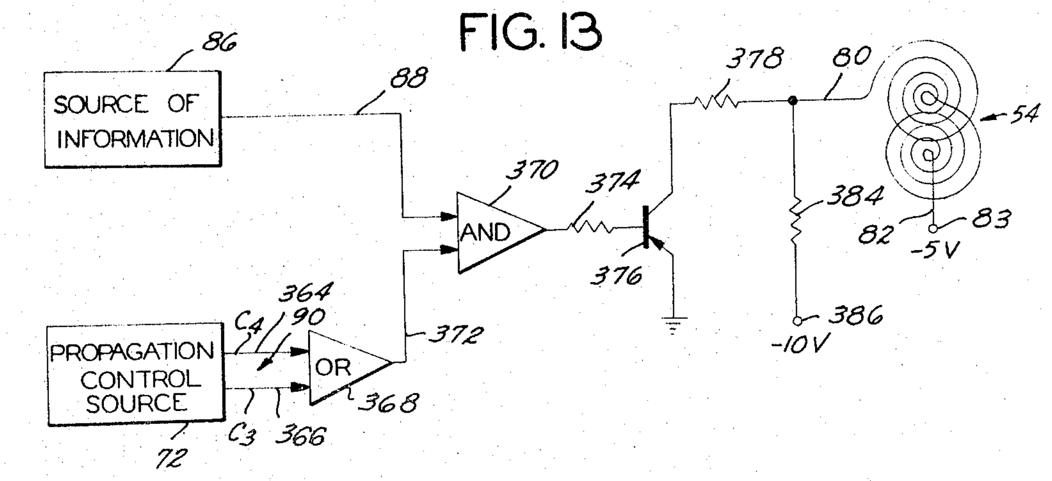
FIG. 13 is a schematic circuit and block diagram of the write circuit of FIG. 1.

The record or write circuit 78 as shown in FIG. 13 responds to signals applied both from the source of information 86 and from the propagation control source 72. The clock signals $C_3$ and $C_4$ of the waveforms 204 and 206 (FIG. 16) are applied through leads 364 and 366 of the composite lead 84 of FIG. 1 to an "or" gate 368. An "and" gate 370 responds to clock pulses applied from the "or" gate 368 through a lead 372 and to binary informational pulses applied from the source of information 86 through the lead 88. The output signal of the "and" gate 370 is applied through a resistor 374 to the base of a pnp type transistor 376. The emitter of the transistor 376 is coupled to ground and the collector is coupled through a resistor 378 to the lead 80, which in turn is coupled to one end of the record or write coil 54, the other end of the coil being coupled to the −5 volt terminal 83. The lead 80 is also coupled through a resistor 384 to a −10 volt terminal 386 to provide a current through the coil 54 flowing in the opposite direction from current flowing through the transistor 376.

Figure 16:
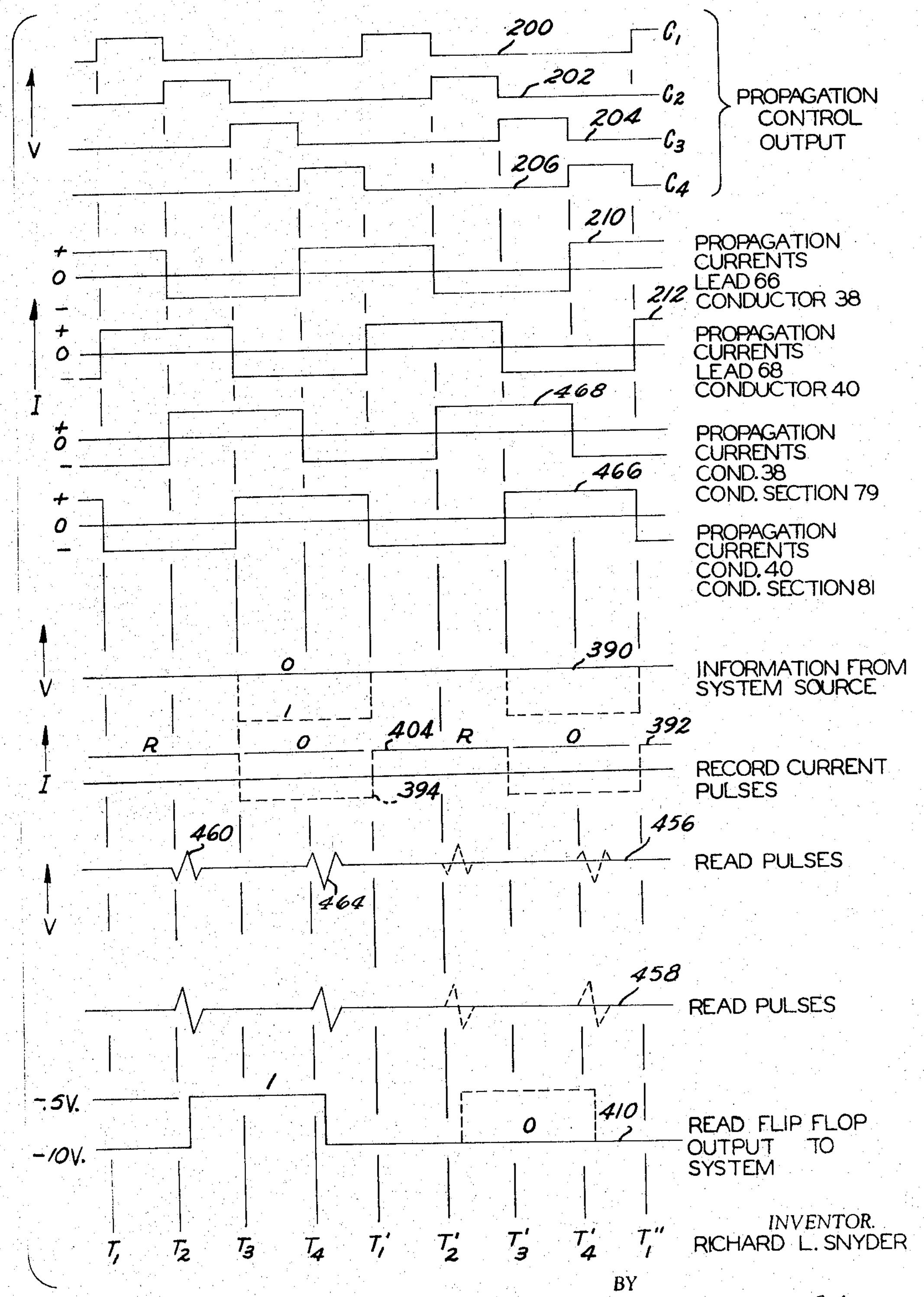
FIG. 16 is a diagram of waveforms for further explaining the operation of the shift register system of FIG. 1.

For writing a binary bit into the wires 24 and 26 of FIG. 1, an information signal as shown by a waveform 390 of FIG. 16 is applied on the lead 88 to the "and" gate 370. The clock pulses $C_3$ and $C_4$ are also applied to the "and" gate 370. Thus, during the coincidence of the clock pulses and information pulses at times $T_3$ and $T_4$, that is, between times $T_3$ and $T_1'$, a negative information signal may be applied to the base of the transistor 376 and current as shown by a waveform 392 flows in a first direction through the record coil 54. For representing the binary information, a binary "zero" is selected as the upper voltage level of the waveform 390 and a binary "one" is selected as the lower voltage level of the waveform 390. Between times $T_3$ and $T_1'$, a voltage level of the waveform 390 representing a "zero" prevents a signal from passing through the "and" gate 370 maintaining the transistor 376 non-conductive, and current of the waveform 392 flows in the "zero" direction through the coil 34 from the terminal 382 to the terminal 386.

Between times $T_3$ and $T_1'$, a voltage level of the waveform 390 representing a "one" coincides with the clock pulses $C_3$ or $C_4$, passing a negative pulse through the "and" gate 370 to bias the transistor 376 into conduction. Thus, a record current pulse such as at level 394 of the waveform 392 of FIG. 16 passes through the record coil 54 in the direction to establish a magnetic domain of a predetermined polarity representing a binary "one" in the wires 14 and 26 of FIG. 1. The magnetic domains in the wires 14 and 26 which are alternately a digit domain of a selected magnetic polarity and a reference domain of a fixed polarity appears as shown by respective arrows 474 and 484 of FIG. 15.

Thus, the normal current flowing from the terminal 83 to the terminal 386 at a current level 404 of the waveform 392 establishes a magnetic domain of the polarity that is selected to represent a binary "zero" state in the wires 14 and 26. During a portion of the four cycle sequence of operation, a magnetic domain of a reference R polarity is recorded on the wires 14 and 26 having the same magnetic orientation or polarity as a "zero". Thus, during periods starting with times $T_1$ and $T_2$ of FIG. 16 when clock pulses $C_1$ and $C_2$ are applied to the driving circuit 64, the current level and direction as shown by the waveform 404 is maintained through the coil 54 so that a reference domain is established in the combined wires 14 and 26. It is to be noted that the current levels of the waveform 392 are selected to rapidly establish magnetic states in the wires 14 and 26 and to overcome the propagation field thereat. Also, the driving currents of the waveforms 210 and 212 are selected of a level so that the driving fields developed do not affect the magnetic orientations established during writing. Currents are selected for the waveforms such as 210 and 212 to develop translating fields of 2 to 4 oersteds for example. The writing current of the waveform 392 is selected to produce a total magnetomotive force of over 20 to 35 oersteds for example to insure nucleation, that is, to establish a domain of opposite polarity in the region between reference domains.

Referring now to FIG. 14, the read circuit 98 responds to signals induced in the sense coil 56 by propagation of the magnetic domain walls (FIG. 15) to apply output pulses of a waveform 410 to the lead 100 representing binary information stored and propagated through both of the magnetic wires 14 and 26. The sense coil 56 which may have one end coupled to ground through the end 96 is coupled to a first winding 412 of a transformer 414 through the lead 94. A second winding 416 of the transformer 414 has one end coupled through a resistor 418 to the collector of a pnp type transistor 420 and has the other end coupled to the base of the transistor 420. Also, the winding 416 is coupled to ground through a biasing resistor 422 and to ground through a bypass capacitor 424. The emitter of the transistor 420 is coupled to ground and the collector is coupled through a resistor 426 to a −10 volt terminal 428.

The signal developed on the collector of the transistor 420 is applied through a coupling capacitor 430 to the base of a pnp type transistor 432 of a flip flop 434. The flip flop 434 also includes a pnp type transistor 436 with the emitters of the transistors 432 and 436 coupled to ground and the collectors coupled through respective resistors 438 and 440 to a −10 volt terminal 442. The bases of the transistors 432 and 436 are coupled to ground through respective resistors 444 and 446. The base of the transistor 432 is also coupled to the collector of the transistor 436 through a control circuit including a parallel coupled resistor 448 and a capacitor 450. In a similar manner, the base of the transistor 436 is coupled to the collector of the transistor 432 by a suitable control circuit including a parallel coupled resistor 452 and capacitor 454. The output binary signal of the waveform 410 is derived from the collector of the transistor 436 and applied through the lead 100 to the source of information system 86 of FIG. 1, for example.

In operation, as the magnetic domains in the wires 14 and 26 as shown in FIG. 15 are propagated to a position adjacent to the read head 56, the informational signals of a waveform 456 or of a waveform 458 of FIG. 16 are derived therefrom depending upon the type of sense coil utilized. The sense coil 56 shown in FIGS. 9 and 11 develop the signal of the waveform 456 because of the summing action. The sense coil of FIG. 10 with a single loop adjacent to the magnetic wires 14 and 26 develops the signal of the waveform 458. The sense coil of FIG. 11 develops the signal of the waveform 456 as the domain walls in the wire 14 pass over both loops 196 and 198. It is to be noted that if the wires 14 and 26 were positioned to pass over a single loop of the structure 194 of FIG. 11, the sensed signal would appear as the waveform 458. A "zero" may be selected as the absence of an output signal at the read coil 56 and a "one" may be sensed by a sequential small negative, a large positive and a small negative pulse as shown by the waveform 456 followed after a delay by a small positive pulse, a large negative pulse and a small positive pulse. Also a "one" is represented by the signals of the waveform 458 when the sense coil of FIG. 10 is utilized. Thus, during a "zero" condition or the absence of a signal at coil 56 such as at times $T_2'$ and $T_4'$, the transistor 432 is conductive and the transistor 436 is non-conductive, so that a −10 volt level of the waveform 410 is applied to the lead 100. When a "one" condition is being interpreted and a positive pulse such as 460 is sensed by the coil 56 such as at times $T_2$ and $T_4$, the flip flop 434 changes state so that the transistor 432 is biased out of conduction and the transistor 436 is biased into conduction. Thus, a pulse of the waveform 410 at a level of approximately −0.5 volt is applied to the lead 100 indicating an interrogated "one." At the occurrence of a negative pulse 464 of the waveform 456, the flip flop resulting from the adjacent domain wall 434 changes back to its original reset stated with the transistor 436 non-conductive and the transistor 432 biased into conduction to again apply a binary "zero" voltage level of −10 volts to the lead 100 such as shown by the waveform 410 shortly after time $T_4$.

Depending on the speed of propagation of the magnetic domains (FIG. 15) along the wires 14 and 26, the pulses 460 and 464 of FIG. 16 are sensed a short time subsequent to times $T_2$ and $T_4$ or corresponding times of other four cycle sequences. Also, it is to be noted that the time of occurrence of the output pulses 460 and 464 is dependent upon the position of the read coil 56 relative to the conductors which position may be selected to provide other timing arrangements in accordance with the principles of this invention.

Referring now back to FIG. 4 which shows the polyphase driving conductors as well as to FIG. 16, the current of the driving pulses applied to the conductor sections 43 and 45 of the respective conductors 38 and 40 returns to ground through respective conductor sections 39 and 41 in the opposite direction. A positive current pulse applied to the conductor section 43 as shown by the waveform 210 is a negative current pulse through the conductor section 79 as shown by a waveform 468 of FIG. 16, and a negative current pulse applied to the conductor section 43 is a positive current pulse when flowing through the conductor section 79. A similar relation exists between the driving pulses applied to the conductor section 45 as shown by the waveform 212 and returning through the conductor section 81 as shown by the waveform 466. This continual change of current direction around the array 36 as shown by the waveforms 210, 212, 468 and 466 applies the continually repetitive propagating fields to the wires 14 and 26.

The sequence of the conductor currents through adjacent segments of the conductors 39 and 40 is thus shown shortly after time $T_1$, $T_2$, $T_3$ and $T_4$ of the four phase sequence in FIG. 16. The driving current signals shown are continuous and at constant frequency. They may, however, be interrupted and allowed to fall to zero at any time after the period required to propagate a domain wall past the widest section of the driving conductors. Because the magnetic wires 14 and 26 are spirally wound, the conductor segments by changing radial direction apply continuous propagating fields to the magnetic wires.

The segments of the driving conductors are shown in FIG. 15 so that the direction of propagation of the magnetic domains from the write coil 54 to the read coil 56 is from left to right through the wires 14 and 26 for convenience of explanation. Because of the spiral winding of the wires 14 and 26, the polyphase conductors 38 and 40 are effectively repetitive as shown by the cross sections thereof with current flowing in opposite directions through adjacent sections of the same conductors 38 and 40. The input coil 54 and the output coil 56 are placed adjacent to the magnetic wire 14 of the spiral 15, for example. It is to be noted that for clarity of explanation only a few sections of the conductors and a short length of the wires 14 and 26 are shown with the write and sense coils at opposite ends thereof but it is to be understood that many more effective conductor sections and longer wires may be utilized in the arrangement of FIG. 1. Also for convenience of illustration the tapered portions of the wires 14 and 26 at the sense coil 56 is not shown in FIG. 15. During writing, complementary magnetic domains of opposite polarity are established in the two wires 14 and 26. In the example shown, a binary "101" has been previously recorded in the wire 14 as shown by the arrows 470, an arrow portion 472 and a arrow 474 indicating a condition shortly after time $T_1$. The polarity for a "zero" has been selected with the arrow to the right and the polarity for a "one" has been selected with the arrow to the left in the wire 14. Reference domains shown by arrows 478, 480, 482 and 484 are of the same polarity as the "zero." In the wire 26, the complementary domains are indicated by oppositely directed arrows. Considering the view presented in FIG. 15, it may also be convenient to designate a "zero" and a reference R as having a clockwise magnetic polarity and a "one" as having a counterclockwise magnetic polarity. It is to be noted that arrow portions 472, 480 and 482 are two reference portions and a "zero" portion because each magnetic domain combines or expands to a domain of opposite polarity. Each magnetic domain such as the reference domain shown by the arrow 484 and the complementary domain of the arrow 486 has an essentially closed magnetic path shown by the arrow 490 and 492 between the magnetic wires 14 and 26 so that the magnetic flux field is effectively retained. Also, the polarity established in the wire 26 for an expanded domain as shown by an arrow 494 is opposite to that of the arrow including portions 480, 472 and 482 to also form an essentially closed magnetic path.

At time $T_1$ the polarity of the driving current of the waveforms 210 and 212 of FIG. 15 in sections such as 43 and 45 of the conductors 38 and 40 is positive as shown by the waveforms 210 and 212 and the polarity of the driving current in the adjacent sections such as 79 and 81 of the conductors 38 and 40 is negative as shown by the waveforms 468 and 466 representing the current flowing in those conductors. At time $T_1$ in response to the record current of the waveform 392, a reference domain of the arrow 484 is established in the wire 14, as well as the domain of opposite polarity of the arrow 486 in the wire 26, as all of the domains are propagated forward one conductor segment width from the previous condition. The writing field is of a substantially larger magnitude than the propagating field so that the domains are established in the wires 14 and 26 regardless of the direction of the propagating field at the write coil 54. Because the other domains are propagated forward, the domain established by the write coil 54 expands with the propagation and is effectively propagated with the other domains in the wires stopping at a domain wall.

At time $T_2$ as shown by the waveforms 210, 212, 468 and 466 the driving current polarities of four adjacent sections of the conductors 38 and 40 starting with the second section are respectively − + + − which is continually repetitive for other sections, and in response to the record current of the waveform 392 the reference domain of the arrow 484 is further recorded in the wire 14 as well as an opposite polarity domain in the wire 26. Each magnetic domain in the wire 14 is again propagated one conductor width forward so that each arrow head or tail, for example, is between two conductors of opposite polarity such as the arrows 484 and 474 between the sections of the conductors 40 and 38. The domain wall of the "one" domain of the arrow 470 is propagated past the read coil 56 so that the positive signal 460 as well as the two smaller negative signals of the waveform 456 are sensed by the read coil to trigger the flip flop 434 of FIG. 14 to a "one" state. The pulse of the waveform 410 to the source of information 86. It is to be noted that the overlapping portion of the sense coil 56 of FIG. 9 provides the large amplitude signal of the waveform 456. With the sense coil of FIG. 10, the sensed signal of the waveform 458 triggers the flip flop 434. Also with the sense coil of FIG. 11 the signal of the waveform 456 triggers the flip flop 434.

At time $T_3$ in response to the driving pulses of the waveforms 210, 212, 468 and 466 the sections of the conductors 38 and 40 starting with the second conductor section have respectively − + + − current polarity applied thereto. Thus, the magnetic domains are propagated one conductor width forward. In response to the record current pulse of the waveform 392 at the level 394 for writing a "one", a magnetic domain shown by an arrow 498 is established in the wire 14 with the corresponding complementary domain in the wire 26 as shown by an arrow 500, both of which are effectively propagated forward to a position between the sections of the conductors 40 and 38. It is to be noted that shortly after time $T_3$, the binary "one" magnetic domain of the arrow 470 has been propagated forward so that the domain wall is between the sections of the conductors 40 and 38, the read coil 56 being adjacent to the conductor 38. Thus, a signal is not sensed at this time.

At time $T_4$ in response to the armature driving pulses of the waveforms 210, 212, 468 and 466 the current polarity of the sections of the conductors 38 and 40 starting with the second section is respectively $+ - - +$ and the magnetic domains are again propagated one conductor width forward to the right so that each domain wall represented by either two arrow heads or two arrow tails is between propagating fields of opposite polarity. Also, at time $T_4$ the current pulse at the level 394 of the waveform 392 for writing a "one" continues and the "one" domain 498 is further expanded. Shortly after time $T_4$, the "one" domain of the arrow 470 is propagated over the coil 38 so that the negative signal 464 of the waveform 456 is sensed thereby and applied to the read circuit 98 to reset the flip flop 434 to the "zero" state as shown by the waveform 410.

The operation continues in a similar manner propagating the domain walls one conductor width forward during each time period with the binary "zero" of the arrow section 472 passing over the coil 56 shortly after time $T_2'$ but not developing a pulse of the waveforms 456 or 458 because a domain wall is not present between a "zero" domain and a reference domain. Thus, the flip flop 434 remains in the "zero" state and the output signal of the waveform 410 remains at the lower or "zero" level. Also, it is to be noted that as shown by the waveforms 456 and 458, a signal is not formed shortly after time $T_4'$ for an interrogated "zero" and the flip flop 434 remains in the reset state. Because the operation proceeds in a similar manner as that discussed above, it will not be explained in further detail.

The double or complementary wire arrangement in accordance with this invention not only allows close spacing of the magnetic wires in the spiral but the domains are relatively immune to destruction from external magnetic fields such as the driving fields.

The magnetic wires in accordance with this invention provide reliable propagation of magnetic domains through very long pieces of wire without loss or destruction of the domains because of the tension maintained in the wire. It has been found that maintaining the wires such as 14 and 26 just below the yield point provides very reliable operation. For annealed magnetic wire, tensions between 10,000 and 60,000 pounds per square inch has been found to be required, depending on the yield point. For hard drawn magnetic wire, tensions between 4,000 and 250,000 pounds per square inch have been found satisfactory depending on the yield point of the particular wire utilized. With hard drawn wire, reliable propagation has been provided through 1,000 feet of magnetic wire. During formation of the taper such as 112 and the larger diameter portions of the wires 14 and 26 as provided by the arrangement of FIG. 8, the source 158 may be controlled to provide a constant force per square inch of cross section. This constant specific tension may provide improved operation for some wire materials. One theory of the tension feature in accordance with this invention is that the crystals in the wire rotate in alignment or balance to complement each other axially so that magnetic axial propagation is enhanced. A high degree of magnetic orientation is produced in the direction of motion of the domain walls. The polishing in accordance with the invention not only provides a desired small diameter but removes nicks and imperfections in the wire which may disturb the propagating domains by forming poles between domain walls. Poles should only exist at the walls.

The relatively small diameter of the magnetic wires in accordance with the invention, allows relatively short magnetic domains to be utilized as the total flux of each magnetic domain is relatively small. The tapered end of the wire increasing to a larger diameter before sensing the signal provides an increased flux and an output signal of increased amplitude for reliable sensing. Thus both smaller domain lengths and close spacing of the spiral sections of the magnetic wire provide a high density shift register in accordance with the invention. The shift register in accordance with this invention allows propagation through the magnetic wires at high speeds. It has been found that the film 12 when a metal such as lead is utilized as in FIG. 2 may provide some limiting to the speed of propagation because of eddy currents developed in the lead. However, this limiting is not present when the film 12 is a non-metallic material such as epoxy.

It is to be noted that the principles of the spiral shift register in accordance with this invention include wires as well as deposited magnetic mediums. Also, the principles of the system in accordance with the invention are applicable to a single spiral configuration or a plurality of spiral configurations magnetically coupled to a driving array.

Thus the magnetic medium or wire must be highly oriented parallel to the direction of wall motion as may be provided by the axial or longitudinal tension. Under these circumstances the movement of a domain wall requires much lower magneto-motive forces that would be required to establish a region of reverse polarity in a length of wire which has initially been magnetized in one direction. The rate or speed at which the wall can be moved is dependent on the amplitude of the propelling or propagating field. Consequently, the observation of a hysteresis loop on a conventional low frequency loop tracing apparatus providing wall motion in response to a sine wave, will show a square hysteresis loop wherein the coercivity is indicated to be of a value nearly as great as the peak exciting field when the latter field does not exceed the nucleation field which is the field required to establish a domain. This indication is caused by the wall being driven to the region near the end of the exciting field of the apparatus where it remains until the field has been rebuilt in the opposite polarity to the value required to cause reverse motion of the wall. It is clear that this recapture field must be nearly equal to the peak value of the field that last positioned the wall near the end of the exciting field or beyond.

When a conventional very high frequency loop tracer apparatus is used having a relatively long sensing coil a rounded hysteresis loop is observed because the wall cannot move fast enough to traverse the exciting coil during the time when the excitation is large enough to cause wall motion. Because of the geometrical and time or velocity effects which are necessarily present during establishment of magnetic domains in the system in accordance with this invention, the definition of the hysteresis loop has not been found to be a completely satisfactory method of specifying these magnetic properties.

Thus there has been described an improved shift register in which the magnetic medium is wound in a spiral configuration on a plate to require a minimum of space per storage bit. To provide reliable performance when utilizing a magnetic wire, the wire is maintained under a predetermined tension. In order to allow a very small magnetic medium to be utilized with relatively close spacing of the spiral, a tapered portion is provided at the end to a larger diameter so that a relatively large output signal is provided. The shift register system in accordance with this invention provides a compact, easily constructed and highly reliable arrangement to store a relatively large number of binary bits and for writing and reading therefrom at a high speed.

What is claimed is:

1. A shift register device comprising a plurality of spiral elements including complementary spirals of a magnetic medium, said spiral elements positioned on a common axis, and propagating conductor means magnetically coupled to said spiral elements.

2. A magnetic shift register device comprising a spiral means of a magnetic material, propagating conductor means magnetically coupled to said spiral means, magnetic domain forming means magnetically coupled to said spiral means, and domain sensing means magnetically coupled to said spiral means.

3. A magnetic shift register element comprising a magnetic medium arranged in a spiral configuration, a domain forming coil adjacent to a first end of said magnetic medium, a domain wall sensing coil adjacent to a second end of said magnetic medium, said magnetic medium having a relatively small cross sectional area along the length thereof except at said second end and having a taper to a relatively large cross sectional area at said second end and adjacent to said sensing coil.

4. A magnetic shift register element comprising a magnetic medium arranged in a spiral configuration, polyphase radial propagating means positioned adjacent to said magnetic medium, a domain forming coil adjacent to a first end of said magnetic medium, a domain wall sensing coil adjacent to a second end of said magnetic medium, said magnetic medium having a relatively small cross sectional area along the length thereof except at said second end and having a taper to a relatively large cross sectional area at said second end and adjacent to said sensing coil.

5. A magnetic shift register element comprising a magnetic wire, a propagating conductor array adjacent to said magnetic wire, a domain forming coil adjacent to a first end of said magnetic wire, and a domain wall sensing coil adjacent to a second end of said magnetic wire, said magnetic wire having a first relatively small diameter at the length thereof except at said first end, said magnetic wire at said first end having a taper to increase said relatively small diameter to a relatively large diameter adjacent to said domain wall sensing coil.

6. A magnetic shift register comprising first and second structural plates respectively having a first and a second magnetic wire fixed on the surface thereof, said first and second plates positioned with the first and second wires adjacent to each other, a radial propagating array positioned between said first and second plates, a magnetic domain forming coil positioned between said first and second magnetic wires adjacent to first ends thereof, a domain wall sensing coil positioned between said first and second magnetic wires adjacent to second ends thereof, a source of propagating signals coupled to said radial propagating array, a source of write current coupled to said magnetic domain forming coil, and a read circuit coupled to said domain wall sensing coil to respond to magnetic domain walls being propagated past said domain wall sensing coil.

7. A shift register system comprising first and second structural plates, first and second wires of a material having magnetic properties and respectively positioned on said first and second plates in a spiral configuration with a predetermined longitudinal tension to allow propagation of magnetic domains therethrough, said first and second plates positioned with said first and second wires adjacent to each other, a two phase driving array having first and second conductors arranged radially between said first and second magnetic wires to provide repetitive magnetic domain propagating fields to said first and second magnetic wires, a write coil magnetically coupled to first ends of said first and second magnetic wires for periodically establishing magnetic domains of selected polarities therein, and a read coil magnetically coupled to second ends of said first and second magnetic wires for sensing the magnetic domains passing thereby.

8. A shift register system comprising first and second structural plates, first and second wires of a material having magnetic properties and respectively positioned on said first and second plates in a spiral configuration with a predetermined longitudinal tension to allow propagation of magnetic domains therethrough, said first and second plates positioned on an axis with said first and second wires adjacent to each other, a two phase driving array having first and second conductors arranged radially between said first and second magnetic wires to apply magnetic domain propagating fields to said first and second magnetic wires, a write coil magnetically coupled to first ends of said first and second magnetic wires for establishing in both of said first and second wires magnetic reference domains of a first polarity and magnetic informational domains of a selected first or second polarity with said reference domains and informational domains being established in a repetitive sequence, and a read coil magnetically coupled to second ends of said first and second magnetic wires for sensing the domain walls between adjacent domains of opposite polarity passing thereby.

9. A shift register system comprising first and second structural plates positioned adjacent to each other, said plates each having a film of soft material on an adjacent surface thereof, first and second wires mounted in the soft material at the surfaces of said respective first and second plates adjacent to each other with predetermined longitudinal tensions, said first and second wires having magnetic characteristics, radial polyphase driving array means positioned between said first and second wires, a magnetic domain forming coil positioned between first ends of said first and second wires, and a domain wall sensing coil positioned between second ends of said first and second wires for responding to magnetic domain walls propagated thereby by said polyphase driving array means.

10. A shift register system comprising first and second plates each having a soft material on the surface thereof, first and second magnetic wires pressed into the soft material of said respectively first and second plates in a complementary spiral configuration with a predetermined axial tension, said first and second plates positioned together with the spiral configuration of wires adjacent and coincident with each other, said first and second wires having a first diameter at first ends and substantially all of the length thereof and having a second larger diameter at second ends thereof changing from the first diameter to the second diameter with a tapered portion, a radial two phase driving array having first and second conductors positioned between the first and second magnetic wires of said first and second plates, a domain forming coil positioned between said first ends of said first and second magnetic wires, a domain wall sensing coil positioned between said second diameter ends of said first and second magnetic wires at the relatively larger diameter, a source of two phase driving currents coupled to the first and second conductors of said driving array for propagating magnetic domains from the first to the second ends of said first and second magnetic wires, a source of write signals coupled to said domain forming coil for establishing informational magnetic domains of opposite polarity relation in said first and second magnetic wires and for alternately establishing reference domains of opposite polarity in said first and second magnetic wires, and a read circuit coupled to said domain wall sensing coil for responding to said informational domains moving thereby to develop informational output signals.

11. A device for sensing magnetic domain walls propagated thereby in a magnetic medium comprising first and second spiral coils wound in opposite directions and connected therebetween at the internal end of said first coil and the external end of said second coil, said first and second spiral coils having portions overlapping each other, said first and second coils both positioned adjacent to the magnetic medium, said first and second coils at the external end of said first coil and the internal end of said second coil developing a relatively large amplitude signal when a domain wall passes the overlapping portion of said coils.

12. An apparatus for forming a magnetic shift register element having a magnetic wire positioned with a spiral configuration on a structural plate, said plate having a surface of a relatively soft material, comprising a rotary shaft holding the structural plate, a pulley wheel having a circumferential surface for holding the magnetic wire and positioned adjacent to the surface of soft material of said plate for pressing the magnetic wire into said soft material, means for moving the pulley wheel toward the center of said plate, variable means coupled to said rotating shaft for rotating said plate at selected rates, means coupled to said variable means and to said means for moving the pulley wheel to move said pulley wheel at predetermined rates relative to the rate of said variable means, a source for supplying magnetic wire to said pulley wheel, means coupled to said source for supplying magnetic wire to provide a predetermined tension thereto, and metal polishing means positioned at a point between said source for supplying magnetic wire and said pulley means for controlling the diameter of said magnetic wire as a function of the polishing time, whereby said plate rotates and the polished wire is fixed in said soft material with a desired spiral pitch and with a desired diameter determined by the speed of said variable means for rotating said plate.

13. An apparatus for fixing a magnetic wire to a plate in a spiral configuration with a selected axial tension to form a shift register element, the plate having a film of a soft material on a surface thereof, comprising first means for rotating the plate on an axis, second means having a pulley wheel with a circumferential edge adjacent to the soft material and movable radially toward the rotating axis thereof, a variable speed motor coupled to said first means for rotating said plate at controllable speeds, cam means coupled between said variable speed motor and said second means for controlling the movement of said pulley wheel radially in a predetermined manner relative to the rotation of said pulley wheel, a source of said magnetic wire for supplying said magnetic wire to the circumferential edge of said pulley wheel, said pulley wheel pressing said wire in said soft material, tension means coupled to said source of said magnetic wire for maintaining said wire under selected axial tensions, and a polishing bath positioned between the source of said magnetic wire and said pulley wheel for decreasing the diameter of said wire as a function of speed of movement of said wire thereby, whereby said cam means determines the pitch of said spiral and the speed of said motor determines the diameter of said wire.

References Cited by the Examiner

UNITED STATES PATENTS 3,230,515 1/1966 Smaller ---------- --340—174
3,241,126 3/1966 Snyder ------------- 340—174

BERNARD KONICK, *Primary Examiner.*

S. URYNOWICZ, *Assistant Examiner.*